United States Patent
Ohta et al.

(10) Patent No.: US 6,868,423 B2
(45) Date of Patent: Mar. 15, 2005

(54) PRODUCTION AND PREPROCESSING SYSTEM FOR DATA MINING

(75) Inventors: Yoshihiro Ohta, Tokyo (JP); Tetsuo Nishikawa, Tokyo (JP); Sigeo Ihara, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 10/076,401

(22) Filed: Feb. 19, 2002

(65) Prior Publication Data

US 2003/0018646 A1 Jan. 23, 2003

(30) Foreign Application Priority Data

Jul. 18, 2001 (JP) ........................................ 2001-218580

(51) Int. Cl.[7] .............................................. G06R 17/30
(52) U.S. Cl. ................... 707/102; 707/103 R
(58) Field of Search .......................... 707/102, 13, 10, 707/100, 103 R; 345/854; 375/240.25

(56) References Cited

U.S. PATENT DOCUMENTS

| | | | | |
|---|---|---|---|---|
| 2002/0051020 A1 | * | 5/2002 | Ferrari et al. | 345/854 |
| 2002/0083039 A1 | * | 6/2002 | Ferrari et al. | 707/1 |
| 2003/0031260 A1 | * | 2/2003 | Tabatabai et al. | 375/240.25 |
| 2003/0097357 A1 | * | 5/2003 | Ferrari et al. | 707/3 |
| 2003/0187854 A1 | * | 10/2003 | Fairweather | 707/10 |

OTHER PUBLICATIONS

Robin McEntire, Peter Karp, Neil Abernethy, Frank Olken, Robert E. Kent, Matt DeJongh, Peter Tarczy–Hornoch, David Benton, Dhiraj Pathak, Gregg Helt, Suzanna Lewis, Anthony Kosky, Eric Neumann, Dan Hodnett, Luca Tolda, Thodoros Topaloglou, "An Evaluation of Ontology Exchange Languages for Bioinformatics", (Aug. 1, 1999) pp. 1–20.

Serge Abiteboul, Dallan Quass, Jason McHugh, Jennifer Widom, Janet L. Wie ner, "The Lorel Query Language for Semistructured Data", Department of Computer Science, Stanford University , pp. 1–21.

* cited by examiner

*Primary Examiner*—Diane D. Mizrahi
(74) *Attorney, Agent, or Firm*—Reed Smith LLP; Stanley P. Fisher, Esq.; Juan Carlos A. Marquez, Esq.

(57) ABSTRACT

Disclosed is means capable of solving trouble in managing data formats and procedures and capable of carrying out advanced preprocessing more intuitively. A data aggregate to be inputted to a mining engine is converted into hierarchical unit trees, and node conditions of the hierarchical unit trees are changed, whereby the data aggregate and a data structure are subjected to dynamic conversion/edition processing. Thus, a system is constructed, in which preprocessing for data mining is unitarily managed/semi-automated.

9 Claims, 23 Drawing Sheets

XML

Element tree

Hierarchical unit tree

```xml
<?xml version="1.0"?>
<root>
    <unit>
        <key>1</key>
        <G1>
            <R1>a</R1>
            <R2>l</R2>
            <R2>m</R2>
        </G1>
    </unit>
    <unit>
        <key>2</key>
        <G1>
            <R1>b</R1>
            <R2>n</R2>
        </G1>
    </unit>
    <unit>
        <key>3</key>
        <G1>
            <R1>c</R1>
            <R2>l</R2>
            <R2>n</R2>
        </G1>
    </unit>
</root>
```
701

XML after group filter applied

FIG. 7

```xml
<?xml version="1.0"?>
<root>
    <R2>l</R2>
    <R2>m</R2>
    <R2>n</R2>
    <R2>l</R2>
    <R2>n</R2>
    <unit>
        <key>1</key>
        <R1>a</R1>
    </unit>
    <unit>
        <key>2</key>
        <R1>b</R1>
    </unit>
    <unit>
        <key>3</key>
        <R1>c</R1>
    </unit>
</root>
```
— 901

XML after Move filter applied

FIG. 9

```xml
<?xml version="1.0"?>
<root>
    <unit>
        <key>1</key>
        <R>a</R>
        <R>l</R>
        <R>m</R>
    </unit>
    <unit>
        <key>2</key>
        <R>b</R>
        <R>n</R>
    </unit>
    <unit>
        <key>3</key>
        <R>c</R>
        <R>l</R>
        <R>n</R>
    </unit>
</root>
```

XML after Rename filter applied

FIG. 11

XML after Delete filter applied

PRODUCTION AND PREPROCESSING SYSTEM FOR DATA MINING

BACKGROUND OF THE INVENTION

1. Field of the Invention

The present invention relates to production and a preprocessing system for analysis of large-scale data.

2. Prior Art

Recent years, as the entire human gene information has been discovered, there has been accumulated enormous array information, experimental data or document information, which is for use in genome analysis projects for a human being and other various creatures. Henceforth, therapy taking individual genes as an object, which is reflected on diagnosis, drug development and the like, will be enabled by elucidating not only arrays of genes but also functions thereof. In a part of medical institutions, individual gene analysis has already been started, which uses a gene analysis technology such as a gene diagnosis system and a DNA chip. Moreover, a wide application of such an analysis technology to novel industries is also expected.

Work of acquiring useful knowledge for the human being from a large amount of data, for example, elucidation of the gene functions from an integrated database regarding the genes is referred to as data mining. Heretofore, as analysis algorithms for carrying out the data mining, a correlation rule, a decision tree, clustering, a neural network, a genetic algorithm and the like have been researched. Each of these methods has been evaluated somewhat well and recognized as a useful algorithm. However, considering feasibility that data accumulated in a large amount can be actually applied to each analysis algorithm as it is, such application can be said to be almost impossible. The analysis algorithm may not directly access data stored in an RDBMS. Moreover, a necessary data structure may differ depending on each analysis algorithm, and originally, the data may not be as normal as expected. It is said that a cost required for such preprocessing for the data mining occupies 60% of the entire cost for the process.

Since there has not been a standard speculation yet as to which range in the entire process the preprocessing is referred to, preprocessing in various forms has been researched. In a database, a data query language represented by an SQL is used fully to operate data. Similarly, also in The World Wide Web Consortium (W3C) providing the extensible Markup Language (XML) (refer to http://www.w3.org/XML/), various researches have been made in order to realize data operation using a data query language. The researches described above have an object in providing means for operating data, but not in automating the operation itself. Availability of the XML has been recognized in various fields. For example, also in the field of bioinformatics, the XML has acquired evaluation as below. Specifically, according to the evaluation, though the XML has low expressivity of semantics since it is self-descriptive, ontology will be described by the XML owing to describability inherent in grammar thereof, sureness in a structure, handling easiness, a degree of penetration and the like.

With regard to a method for navigating a tree structure, there has been a tool proposed by IBM Japan Co., Ltd. and so on (see the gazette of Japanese Patent Laid-Open No. 2000-194466). Regarding an object tree, this tool only displays a path from a moving point to a root of the tree structure and a complete subtree of moving points in movement to a non-leaf node in navigation. Although the method is good as an interface for exploring target information from an object tree that is asymmetric and is formed in a complicated structure, the method cannot dynamically transform a data aggregate or a data structure upon receiving a request from a user.

SUMMARY OF THE INVENTION

In the event of the preprocessing for the data mining, many applications, data formats and procedures must be managed by the human being, and a process thereof is accompanied with much labor and difficulty.

The present invention has an object to provide means capable of solving trouble in managing the data formats and the procedures and capable of carrying out advanced preprocessing more intuitively in the preprocessing for the data mining.

The present invention provides a method capable of handling data aggregates of various types unitarily and capable of dynamically changing the data aggregate and the data structure by reflecting an interaction from a user in the event of the preprocessing for the data mining. Moreover, the present invention provides an interface for the method. Concretely, a data aggregate to be preprocessed is divided into small processing units that are XML data, processing filters for the processing units are generated by a system, and the user selects the processing filters. Thus, the preprocessing that has been hitherto performed manually can be executed with good efficiency. Specifically, the data structure in the large amount of data is created independently of the data, and the data structure thus created is transformed, thus efficiency of the transformation processing is promoted.

In order to implement these functions, the following processing is executed for the data. The data aggregate is converted into a hierarchical unit tree of the XML format, and the data aggregate is decomposed into processing units. Moreover, the hierarchical unit tree obtained herein is visually displayed.

Inspection is executed as to whether or not a filter for removing a noise and so on can be applied to the hierarchical unit tree and the data aggregate of the XML format. Then, a conversion request from the user is executed for the hierarchical unit tree displayed on a screen via operation such as dragging of a mouse on the screen.

The data aggregate converted and created by the user is analyzed by use of a mining engine. Based on a result of the analysis, the data conversion can be executed again.

The XML handled in the present invention has been proposed by the W3C and is a limited subset of the Standard Generalized Markup Language (SGML) originally prescribed as a standard of an electronic filing document by the ISO. The entire XML documents always fit the SGML standard. The reason why the XML is established is as below. Specifically, though the SGML document having an optional document format has been desired to be widespread as a standard similarly to the Hyper Text Markup Language (HTML) that has already been widespread, the SGML document difficult to be implemented has been hard to be widespread. As a result of extensive researches, the XML has been designed to maintain mutual operationality for both of the SGML and the HTML. In the W3C, as design goals of the XML, the following points are enumerated.

The XML can be used as it is on the Internet.

The XML supports applications in a broad range.

The XML has compatibility with the SGML.

A program for processing the XML document can be readily written.

In the XML, functions of options can be minimized as much as possible, and ideally, no function should exist.

The XML document is easy to be read and fully understood by the human being.

Design for the XML is carried out fast.

Design for the XML is to be definite and simple.

The XML document can be readily created.

In the XML, it is not important to reduce the number of markups.

There are no other data formats achieving all of these design goals. For example, as a system for making the XML usable as it is on the Internet, a naming space is prepared, and thus enabling naming of a unique document in the world by use of a URL and definite regulating of a data structure by use of Data Type Definition (DTD). Moreover, a Document Object Model (DOM) and a Simple API for XML (SAX) as Application Program Interfaces (API) for processing the XML document have been introduced by the W3C, and all of the XML processing systems conform to these APIs.

The XML document has a logical structure and a physical structure. Physically, the document is composed of a unit as an entity. If an entity refers to the other entity, the entity referred to also becomes a part of the document. The document starts from a root, that is, a document entity. Logically, the document includes a declaration, an element, a comment, a letter reference and a processing instruction, all of which are shown by explicit markups in the document. The logical structure and the physical structure must be nested definitely.

It can be said that the widespread of the XML combining definitiveness and implementation easiness is along a natural flow. XML parsers for structure analysis and style sheets for shaped display are announced one after another by various vendors. Concurring with the above, the XML has come to be used not only on the Internet but also for data exchange in other fields relating to a computer.

For example, in an article of bioinformartics (Robin McEntire, Peter Karp, Neil Abernethy, et al., "An Evaluation of Ontology Exchange Languages for Bioinformatics", ISM B2000.), mentioned is that, in information accumulation in the field of bioinformatics, not the conventional list structure for use in LISP but a data structure using the XML will come to be necessary considering input easiness and affinity for various applications for use in information display and information analysis.

As described above, the XML fits the object of the data formats required in the present invention. A format such as a flat table and a relational database, which has been hitherto used in the preprocessing, is insufficient, and a data structure to be handled is required to be shaped in a tree structure or a graph structure. The XML has a tree structure, and no problem occurs regarding the affinity for the other applications, which is required in the preprocessing performing various types of processing. Furthermore, considering the actual condition where a large amount of information to be accumulated is being changed to the XML, it can be said that the preprocessing using the XML is rather along a natural flow.

The present invention has an object to realize processing using transformation of the XML for the preprocessing mainly targeted to transformation of the data structure, at which the relational database is not good. In this event, the premise is made that the preprocessing can be carried out by use of a system capable of realizing automatic preprocessing.

Here, when the preprocessing for the data mining is carried out by use of the variation of the XML, there appears a problem that operation definition is troublesome. This is because the data used for the data mining has a very large number of elements as compared with an XML document typically exchanged by EDI and the like. An interface of the DOM or the SAX, which is prepared by the W3C, only supports movement of one entity at a time. Therefore, some systems referring to many elements are required.

The reason why the operation can be defined by brief SQL sentences in the relational database is that combination of simple table structures is used and that a large amount of data can be designated at a time on columns and rows. As a typical research for referring to or moving many entities as described above in the XML, there is XML-QL (S. Abiteboul, D. Quass, J. McHugh, J. Windom, and J. Wiener, "The Lorel query language for semistructured data", International Journal on Digital Libraries, 1(1): 68–88, April 1997.). The XML variation of the present invention can be expressed by use of the XML-QL. However, as problems on the use of the XML-QL, the description is accompanied with some abstrusities, and the variation is carried out in a black box manner. For example, for a request such that movement of only a certain element is cancelled after moving a plurality of elements, a query sentence is required to be rewritten.

In the present invention, consideration is made for enabling such back track and for a small processing unit obtained by decomposing the entire of the preprocessing in order to automate the preprocessing. This is a similar conception to "action for planning" as classical means of machine learning, which can be said to be a natural way of thinking. Concretely, small variation for the XML is referred to as a filter, and the entire of the XML variation is realized by applying free combination of such filters.

Here, considering as to what unit the filters are required to be divided into, it may be said that one filter is realized by creating or moving one element of the XML. However, it is self-evident that the number of necessary filters is being increased as the number of elements is increased if the filters are divided in such a manner as described above. Accordingly, in order to make it possible to create the filters efficiently and to provide an easy-to-see view, as shown in FIG. 4, proposed is a structure referred to as a hierarchical unit tree, which is capable of viewing the entire of the XML at a glance and well resembles the conception of the Data Type Definition (DTD). The hierarchical unit tree is a structure decided irreversibly by the XML data and does not include the contents of the data. Filters for the hierarchical unit tree are made to correspond in advance to filters subjected to the XML variation, and the XML data is preprocessed by use of an aggregate of the filters decided on the hierarchical unit tree.

In order to generate the hierarchical unit tree, an algorithm shown below is used.

~Expression 1]

```
1 UnitNode makeUnitRoot (Element docRoot)
2 begin
3 UnitNode unitRoot=new UnitNode ( );
4 makeUnit(docRoot, unitRoot);
5 return unitRoot;
6 end
7 void makeUnit(Element docNode, UnitNode unitNode)
8 begin
9 for each docChild in docNode.childElements
10 begin
```

```
11 if (not unitNode.hasChild(docChild.name))
12 begin
13 UnitNode newChild=new UnitNode ( );
14 newChild.name=docChild.name;
15 unitNode.appendChild(newChild);
16 end
17 unitChild=unitNode.getChild(docChild.name);
18 if(flag(docChild.name)==true)
19 begin
20 unitChild.multiple=true;
21 end
22 flag(docChild.name)=true;
23 makeUnit(docChild, unitChild);
24 end
25 end
```

Among them, the function of makeUnitRoot is a function for creating hierarchical unit tree. In the first to sixth rows, the function of UnitRoot is called by handing the document entity and a newly created node of the hierarchical unit tree to makeUnit as a recursive function. Unit is a function for obtaining a hierarchical unit tree below unitNode based on information of docNode, whereby roots of the hierarchical unit tree structured based on docRoot are stored in unitRoot in the third row. makeUnit is operated as below.

1. Children of docNode are sequentially assigned to docChild in the ninth row.

2. If there exists no child having the same name as docChild in unitNoe in the eleventh to sixteenth rows, new UnitNode is created, to which the same name as docChild is given, and then set as a child of unitNode.

3. UnitNode that is a child of unitNode and has the same name as docChild is assigned to unitChild in the seventeenth row.

4. If Element exists below one docNode, the Element having the same name as the docNode, then a multiple field of UnitNode representing the concerned Element is set true in the eighteenth to twenty-second rows.

5. The function of makeUnit in the twenty-third row is called recursively.

The document entity of the XML document is handed to an argument of the function of makeUnitRoot, whereby, seen from the document entity, elements reached through the same path are collected, and root elements of the hierarchical unit tree is obtained, where the multiple field representing whether or not a relationship among the elements is a one-to-multi relationship is appropriately set. Hereinafter, the above-described elements reached through the same path will be referred to as symmetric elements.

The XML data exemplified in FIG. 3 has a hierarchical structure as shown in a lower part of the drawing. On the other hand, in the case of applying the function of make UnitRoot, the hierarchical unit tree as shown in FIG. 4 is created. As shown in the hierarchical unit tree, there are elements of "unit" in the one-to-multi relationship under "root", and one "key", one "R1" and a plurality of "R2" belong to the elements of "unit". The hierarchical unit tree is a tree structure reflecting only the data structure of the XML data, and does not include the contents of the data. Moreover, redundant data structures are merged and optimized.

Next, a schematic configuration of the entire system according to the present invention is shown in FIG. 1. As input formats, conceived is every input format such as a table, a relational database, a text and an XML, which is converted into the XML by a simple program, and then inputted to this system. Actually, this system implements a simple conversion program from the Comma Separated Value (CSV) file to the XML file, which carries out conversion as shown in FIG. 5.

The XML file inputted is represented as a DOM in the system. The DOM is an object tree defined by the W3C, which is obtained by converting the XML reversibly. The DOM implements an API for changing the tree structure. By use of the API, a hierarchical unit tree corresponding to the inputted XML is generated. While viewing the hierarchical unit tree, a user proceeds to constitute a filter path as a combination of filters by use of an interface prepared on a Web browser. To the hierarchical unit tree without data, which is a compact object tree for the XML as a source of the conversion, the filter path can be applied instantaneously. While viewing a state of the hierarchical unit tree, the user proceeds to select the preprocessing. When the preprocessing proceeds to some extent, the filter path applied to the hierarchical unit tree is also applied to the XML, thus generating an XML for analysis. The filter path mentioned herein is a filter path for the XML, and the filter path for the hierarchical unit tree is defined in advance for each filter. The XML file for analysis can be inputted to an analysis algorithm. A result of the analysis can be browsed on the Web browser or taken out as a file. The filter path is corrected by viewing the result.

The filter path during operations for the above is automatically saved, and the user can automatically select the filter path by use of weighting derived from resemblance of the hierarchical unit trees. By iterating the above operations, the preprocessing capable of obtaining more interesting results is going to be explored. Application of various filters to the hierarchical unit trees, that is, an operation history for the hierarchical unit trees is saved in a history file, and thus the operation can return to a state of the hierarchical unit tree in a step before the step applied with the filter by some steps according to needs. And, to the hierarchical unit tree in the state to which the operation returns, another filter string can be applied.

The interface used by the user is roughly classified into the following three categories.

Browsing and operation of the hierarchical unit tree

Browsing and operation of the filter path

Answering a question which the system makes

The browsing and operation of the hierarchical unit tree and the browsing and operation of the filter path are performed on the same screen. For example, on the screen shown in FIG. 16, the left side thereof shows an interface for the browsing and operation of the filter path, and the right side thereof shows an interface for the browsing and operation of the hierarchical unit tree.

The browsing and operation of the hierarchical unit tree is carried out on an Applet shown in FIG. 16. Differences between a leaf node and a non-leaf node and between the numbers of times these nodes appear in the XML document are designed to be grasped at a glance by colors and shapes. Each circle and square represents a relationship between elements. The circle represents that a relationship between an element and a child element is one to one, and the square represents that the relationship between the element and the child element is one to multi. The number in each element represents the number of times the element appears during conversion from the XML to the hierarchical unit tree. A name of the element is displayed near the circle or the square, which represents the element. Application of the filter is basically executed by selecting one or a plurality of nodes and pressing a button for applying the filter. Application of a moving filter to be described later can be also made by drag& drop from node to node.

The browsing and operation of the filter path is carried out on the HTML on the left-side frame displayed on the Web browser shown in FIG. 16. On the screen, the filter path already applied is displayed as a history 1605. In a filter name portion of the filter path already applied, a hyperlink is set. By clicking the hyperlink, returning can be made to a site which the hyperlink designates. In the case of creating a new filter, when a Create New Filter hyperlink 1609 is clicked, a subwindow 1611 opens, and a candidate of the filter is displayed. Also in a filter name portion displayed on the subwindow 1611, a hyperlink is set, and when the hyperlink is clicked, another interface is displayed, where a detail of the filter is set. The filter thus created is added to an end of the filter path. The display of the hierarchical unit tree is always carried out by clicking a View Unit hyperlink. The display reflects a current state of the filter path.

An example of an answer to a question made by the system is shown in FIG. 20. A Mining link 2001 in an upper-part drawing is clicked, whereby an interface for applying a mining engine shown in a lower-part drawing appears. Here, a part 2010 of a file inputted to the mining engine is seen. An option letter string for the analysis algorithm by a decision tree or a correlation rule can be given in by seeing the part of the file and can be executed.

In summarizing the above, a method of preprocessing for data mining according to the present invention comprises the steps of: creating, from XML data, a hierarchical unit tree as a tree structure in which attributes of the XML data are set as a leaf node and a non-leaf node, a relationship between the attributes without including an attribute value is expressed, and a redundant parent-child relationship between the nodes is optimized by merging; adding a change to the hierarchical unit tree; and converting the XML data so as to reflect the change added to the hierarchical unit tree.

The method of preprocessing for data mining according to the present invention comprises the steps of: displaying, on a screen, a hierarchical unit tree as a tree structure in which a leaf node and a non-leaf node, and a branch expressing a parent-child relationship between the nodes are included, both of the nodes corresponding to attributes of XML data, and a redundant parent-child relationship between the nodes is optimized by merging, the hierarchical unit tree being created from the XML data; adding a change to the hierarchical unit tree; and converting the XML data so as to reflect the change added to the hierarchical unit tree.

The operation for adding a change to the hierarchical unit tree includes: an operation (Group filter) for setting a plurality of nodes as child nodes of a node newly created on the same hierarchy as the plurality of nodes having the same non-leaf node as a parent; an operation (Move filter) for moving a designated node to a position of a child of the other node than a current parent of the designated node; and an operation (Rename filter) for changing attribute names of a plurality of nodes to the same attribute name, the plurality of nodes having the same non-leaf node as a parent, and for merging the plurality of nodes. The operation for moving a designated node to a position of a child of the other node than a current parent of the relevant designated node can be executed by dragging the designated node by mouse and dropping the designated node on a node newly to be a parent.

Moreover, it is preferable that a constitution be adopted, in which an operation history for hierarchical unit trees is displayed, the hierarchical unit trees changed by operations are recorded respectively, and when a specified operation step of the operation history displayed is designated, a hierarchical unit tree corresponding to the operation step is displayed.

A preprocessing system for data mining according to the present invention comprises: a display unit for displaying a hierarchical unit tree as a tree structure in which a leaf node and a non-leaf node, and a branch expressing a parent-child relationship between the nodes are included, both of the nodes corresponding to attributes of XML data, and a redundant parent-child relationship between the nodes is optimized by merging, the hierarchical unit tree being created from the XML data; and a filter selection unit for selecting a filter for adding a change to the hierarchical unit tree. It is more preferable that the system further comprises: a history display unit for displaying a history of filters applied to the hierarchical unit tree.

BRIEF DESCRIPTION OF THE DRAWINGS

FIG. 7 is a view showing an example of an XML after the application of the Group filter.

FIG. 9 is a view showing an example of an XML after the application of the Move filter.

FIG. 11 is a view showing an example of an XML after the application of the Rename filter.

DETAILED DESCRIPTION OF THE PREFERRED EMBODIMENTS

Hereinafter, description will be made for an embodiment of the present invention with reference to the drawings.

A display of a hierarchical unit tree, which is proposed by the present invention, is the one that, seen from a root of a tree structure, regards nodes having the same path concerning a node attribute as the same nodes. In the present invention, a coherent operation for the nodes of the hierarchical unit tree can be readily carried out on one view. The hierarchical unit tree is obtained by irreversibly converting an XML. The hierarchical unit tree does not include data but reflects only a data structure. If there exist a large amount of nodes having the same path, the hierarchical unit tree can be expressed by a very small object as compared with the original XML. Therefore, also with regard to an XML including a large amount of data, a data aggregate or a data structure can be changed and edited interactively upon receiving an operation from a user, and thus preprocessing for mining can be carried out efficiently.

Figure 1:
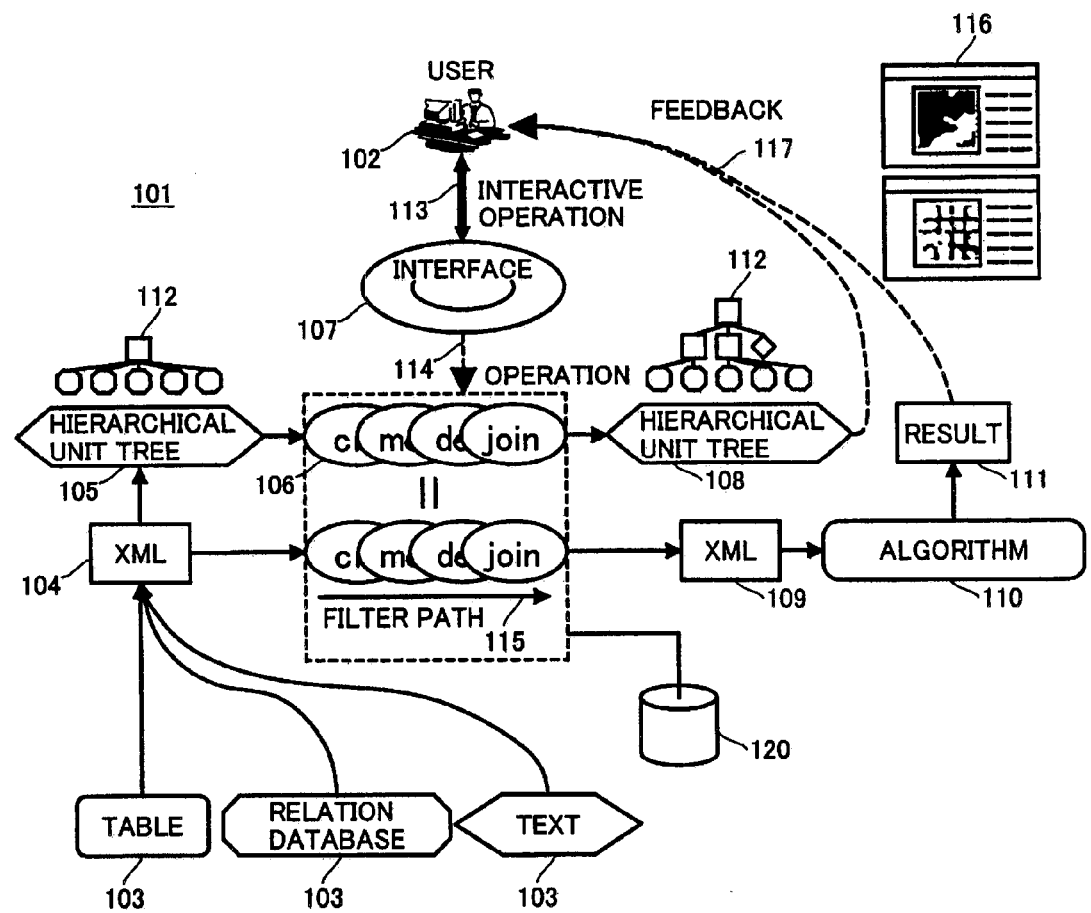
FIG. 1 is a view showing a flow of processing in one embodiment of the present invention.

First, an outline of a system will be described with reference to FIG. 1. A user 102 activates a system 102 and registers XML data 104 obtained by converting input data 103 with the system 101. The XML data 104 is automatically converted into a hierarchical unit tree 105 by a function of makeUnitRoot in the system. The hierarchical unit tree 105 is expressed as a DOM tree 112 inside the system. The user 102 performs an operation 114 for generating filters 106 while confirming the hierarchical unit tree 105 by an interactive operation 113 through an interface 107, thus obtaining a filter path 115. In the case of the operation 114 for generating the filters, a hierarchical unit tree 108 (DOM tree 112) transformed by the filter path 115 is subjected to feedback to the user 102 by the interface 107. The user 102 applies XML data 109 obtained by transforming the XML data 104 by the filter path 115 to an analysis algorithm 110 through the interface 107, and thus the user 102 can obtain an analysis result 111. Through a result display screen 116, the analysis result 111 is subjected to the feedback 117 to the user 102, and thus the user 102 can construct a more sophisticated filter path 115. Moreover, with regard to such a series of operations, the user 102 can obtain a filter path 115 automatically constructed from a history of the operation 114. By iterating the above operations, preprocessing with good efficiency is carried out. The history of the operation for generating the filters is stored in a history file 120 together with the hierarchical unit tree made at each operation. Therefore, the user 102 can anytime return to a moment on the way of the filter path 115, and can resume the operation for the hierarchical unit tree from the moment.

Figure 2:
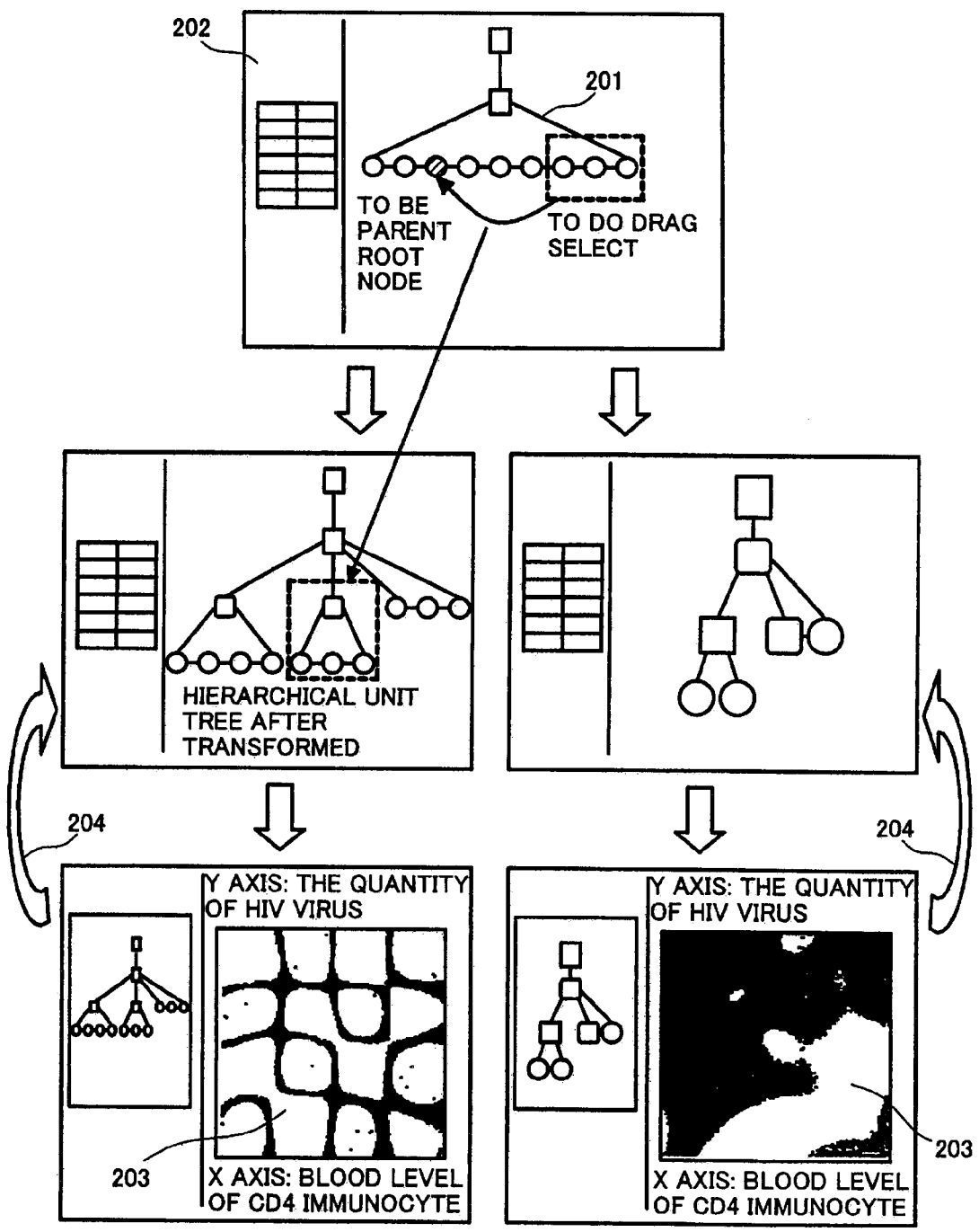
FIG. 2 is a view showing a flow of a display screen in one embodiment of the present invention.
Figure 3:
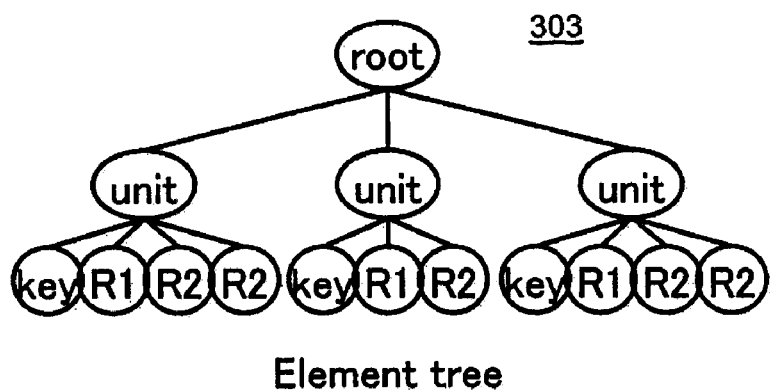
FIG. 3 is a view showing an example of XML data.

FIG. 2 is a schematic view showing a change of a display screen of the system. By inputting the XML data, a hierarchical unit tree 201 is generated and displayed. Filters are generated and selected through an operation frame 202 or the hierarchical unit tree 201, leading to creation of a filter path. The user can display the hierarchical unit tree 201 on an optional spot of the filter path. The user obtains XML data subjected to transformation added to the hierarchical unit tree, that is, preprocessing corresponding to the created filter path. Then, the user inputs the XML data subjected to the preprocessing to the analysis algorithm, and thus can obtain an analysis result 203.

Seeing the result 203, the user is going to sophisticate the operation for the interfaces of the operation frame 202 and the hierarchical unit tree 201 by the feedback 204, thus performing the preprocessing with good efficiency. To change a structure of data given to the analysis algorithm is, specifically, to change an attribute or an amount of the data, a relationship among elements inside the data and so on, which directly affects the analysis result to a great extent. In the example of FIG. 2, since different filter paths are selected for the same data in the right course and the left course, it is understood that data inputted to the respective hierarchical unit trees and mining algorithms differ from each other, and that mining results 203 also differ from each other.

Here, description will be made for types of principal filters applied to the hierarchical unit tree, a transformation state of the hierarchical unit tree by application of the filters, and conversion of the XML data when the filter path is applied to the XML data.

Figure 4:
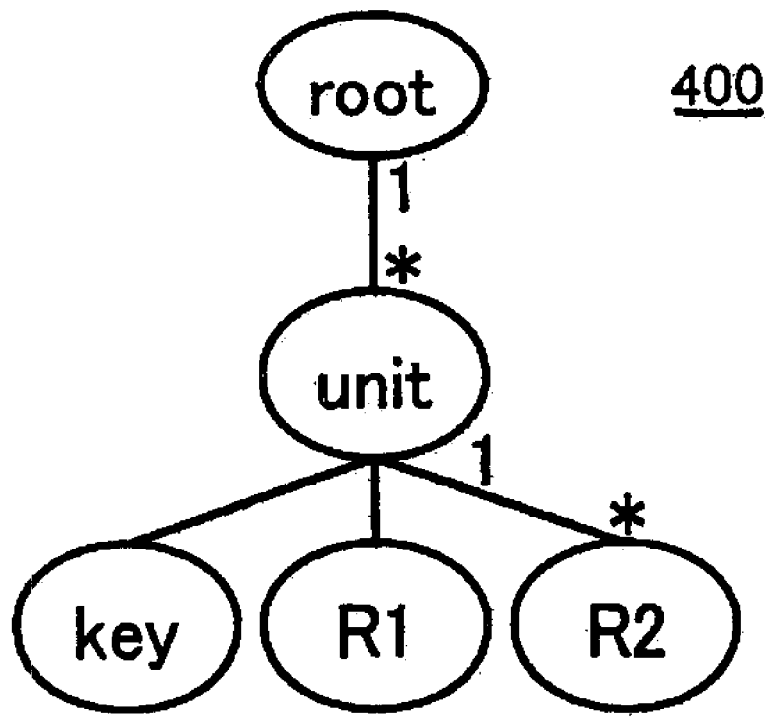
FIG. 4 is a view showing an example of a hierarchical unit tree created from the XML data.
Figure 6:
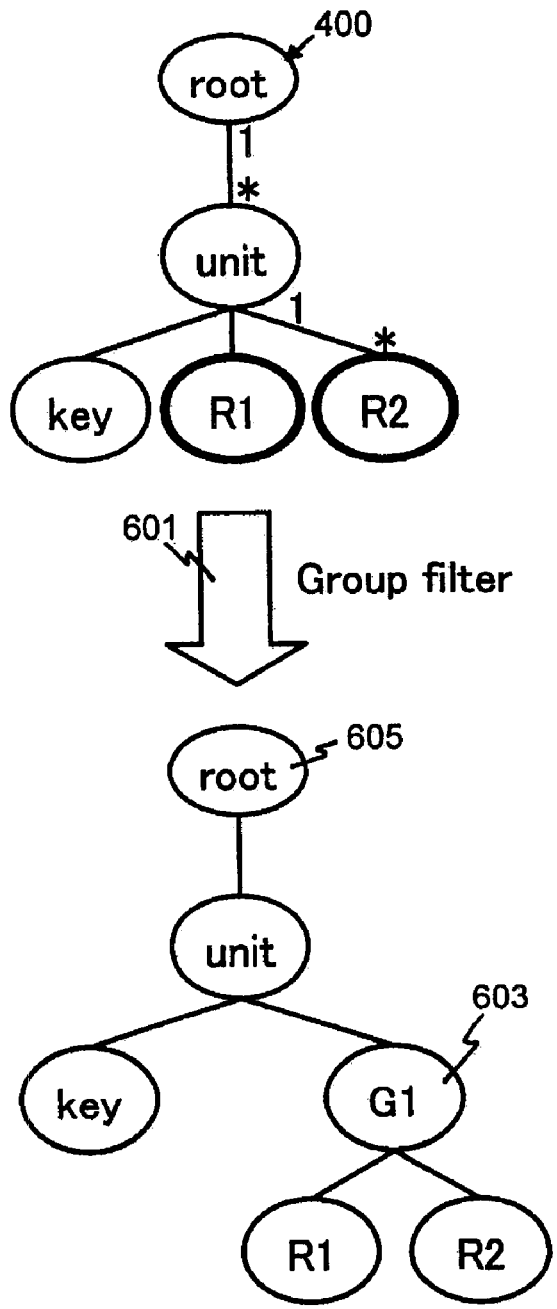
FIG. 6 is an explanatory view for an application example of a Group filter to the hierarchical unit tree.

FIGS. 6 and 7 are explanatory views for an application example of a Group filter. The Group filter is a filter for grouping a plurality of elements having the same element as a parent in the hierarchical unit tree as child elements of an element to be newly created in the hierarchy. In the event of creating the Group filter, relevant elements (elements to be grouped) in the hierarchical unit tree are selected by mouse, and the Group filter is activated. Then, since input of a group name is requested, the group name is inputted, and a desired Group filter is created. FIG. 6 shows a creation example of the Group filter for grouping an element R1 and an element R2 of the hierarchical unit tree shown in FIG. 4 under a newly created element named G1 as a group name. Application of this Group filter transforms the hierarchical unit tree as shown in a lower part of FIG. 6. In the case of this example, an XML after the application of the Group filter becomes as shown in FIG. 7 corresponding to the transformation of the hierarchical unit tree.

Figure 8:
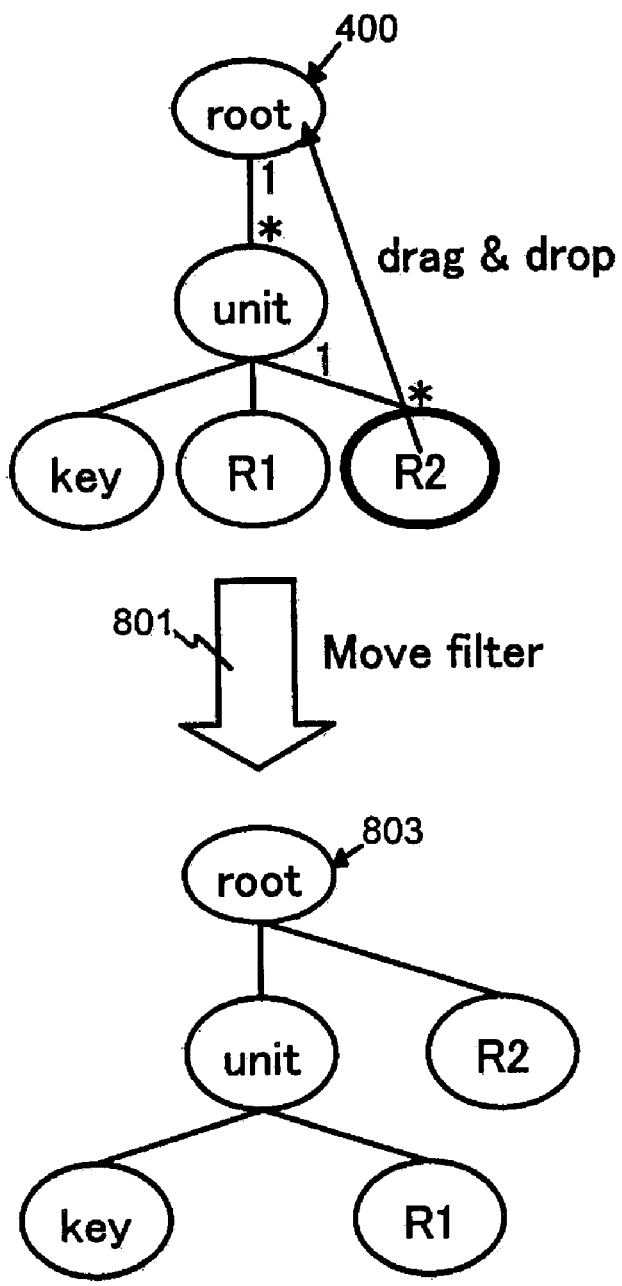
FIG. 8 is an explanatory view for an application example of a Move filter to the hierarchical unit tree.

FIGS. 8 and 9 are explanatory views for an application example of a Move filter. The Move filter is a filter for moving an element designated in the hierarchical unit tree to a position of a child taking the other element than a current parent as a parent. When the element to which the Move filter is applied has child elements, these child elements also move together with the designated element while maintaining a parent-child relationship therebetween. In the event of creating the Move filter, a relevant element in the hierarchical unit tree is dragged by mouse and dropped on an element to be a new parent. By this operation, a Move filter taking the element dragged by mouse as a child element of the new element is created. FIG. 8 shows a creation example of the Move filter for moving the element R2 of the hierarchical unit tree shown in FIG. 4 immediately under the Root. By the application of the Move filter, the hierarchical unit tree is transformed as shown in a lower part of FIG. 8. In the case of this example, an XML after the application of the Move filter becomes as shown in FIG. 9 corresponding to the change of the hierarchical unit tree.

Figure 10:
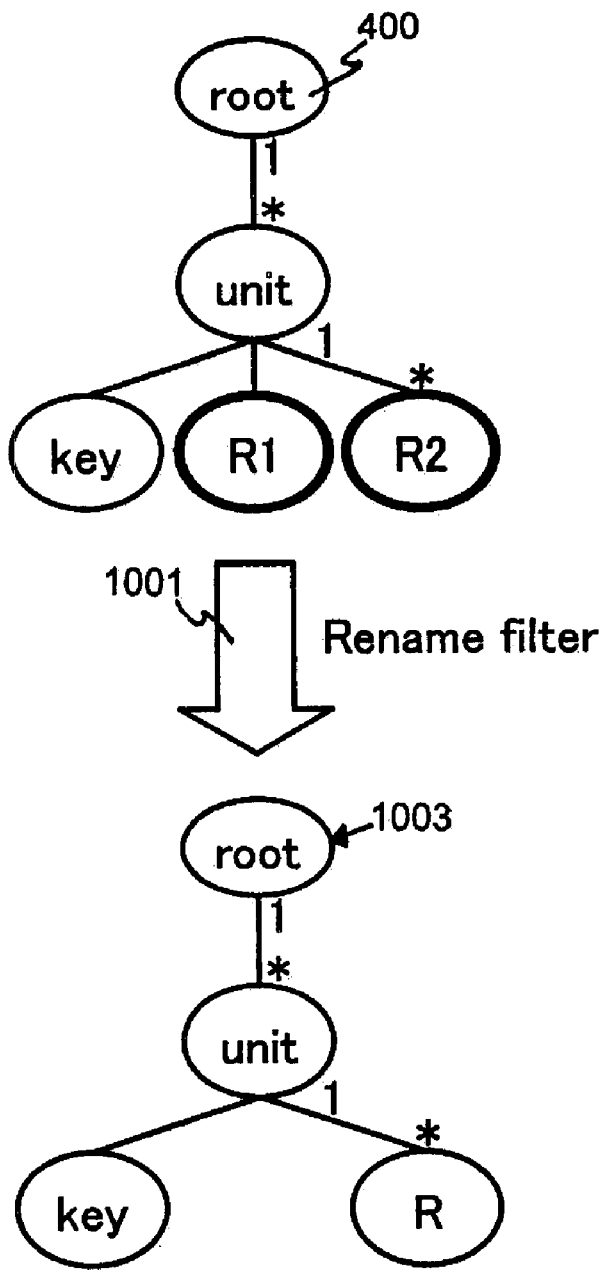
FIG. 10 is an explanatory view for an application example of a Rename filter to the hierarchical unit tree.

FIGS. 10 and 11 are explanatory views for an application example of a Rename filter. The Rename filter is a filter for changing an element name of a designated element. Typically, the Rename filter is used for the case of designating a plurality of elements having different element names, and changing the element names to the same name, thus achieving integration of the data. In the event of creating the Rename filter, a relevant element in the hierarchical unit tree is selected by mouse, and the Rename filter is activated. Then, since input of a new element name is requested, the new element name is inputted. Accordingly, a desired Rename filter is created. FIG. 10 shows a creation example of the Rename filter for changing element names of the element R1 and the element R2 of the hierarchical unit tree shown in FIG. 4 to an element name R. By the application of the Rename filter, the hierarchical unit tree is transformed as shown in a lower part of FIG. 10. In the case of this example, an XML after the application of the Rename filter becomes as shown in FIG. 11 corresponding to the transformation of the hierarchical unit tree.

Figure 12:
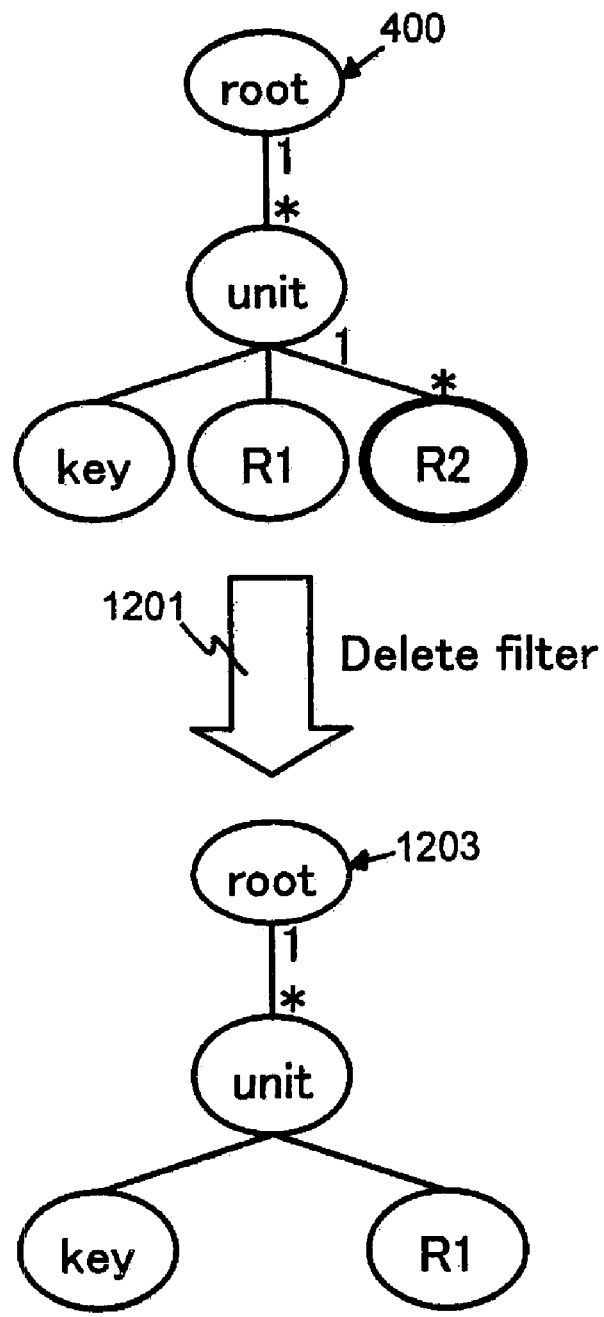
FIG. 12 is an explanatory view for an application example of a Delete filter to the hierarchical unit tree.
Figure 13:
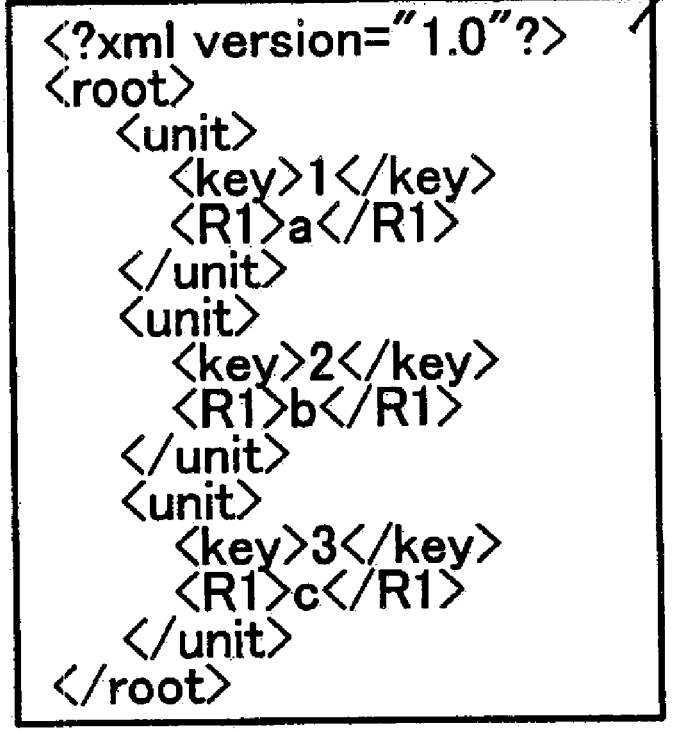
FIG. 13 is a view showing an example of an XML after the application of the Delete filter.

FIGS. 12 and 13 are explanatory views for an application example of a Delete filter. The Delete filter is a filter for deleting a designated element. When the designated element has child elements, the child elements and elements thereunder are entirely deleted. In the event of creating the Delete filter, a relevant element in the hierarchical unit tree is designated by mouse, and the Delete filter is activated. By this operation, the elements connected to the element designated by mouse are entirely deleted. FIG. 12 shows a creation example of the Delete filter for deleting the element R2 of the hierarchical unit tree shown in FIG. 4. By the application of the Delete filter, the hierarchical unit tree is transformed as shown in a lower part of FIG. 12. In the case of this example, an XML after the application of the Delete filter becomes as shown in FIG. 13 corresponding to the change of the hierarchical unit tree.

Figure 14:
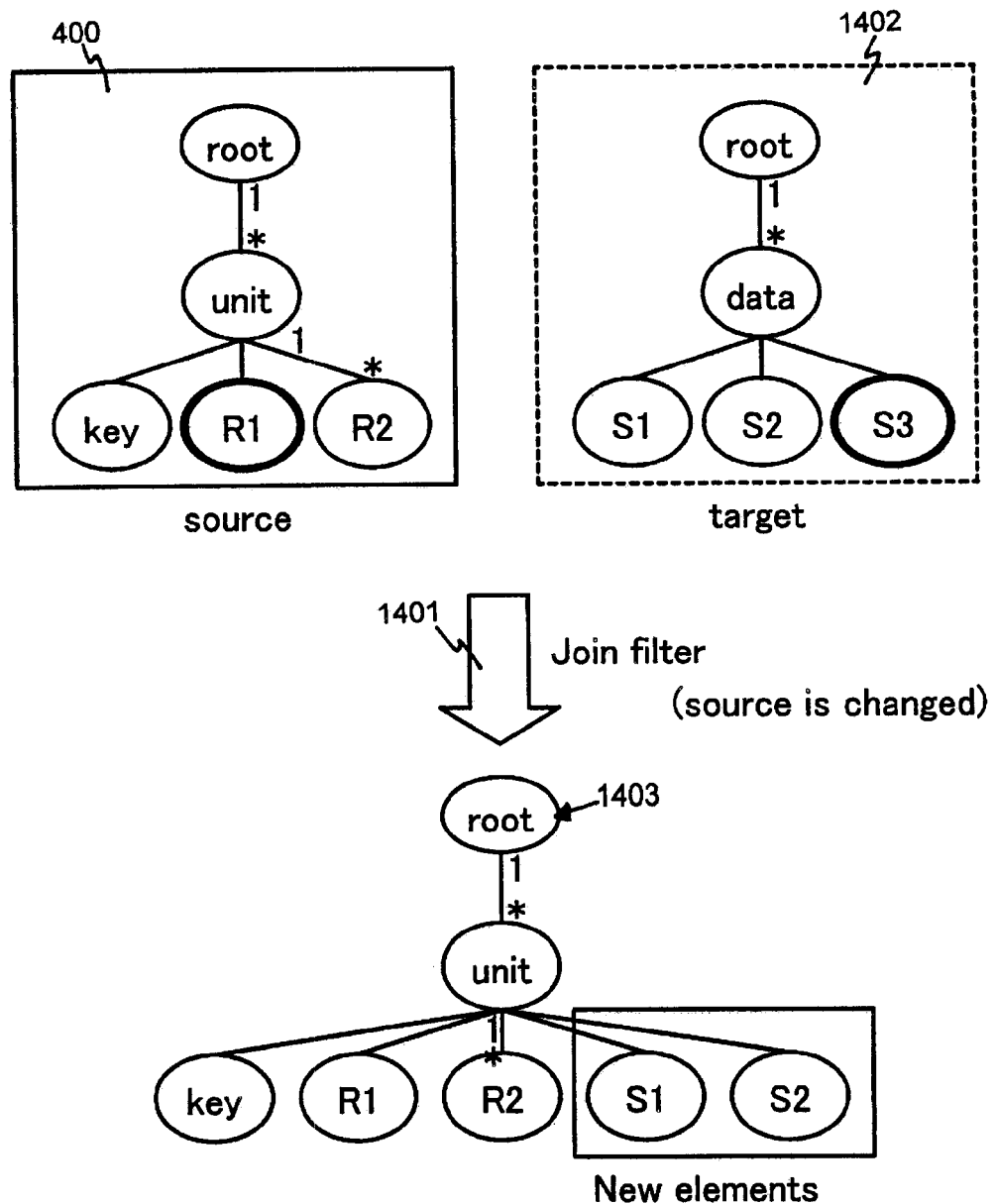
FIG. 14 is an explanatory view for an application example of a Join filter to the hierarchical unit tree.
Figure 15:
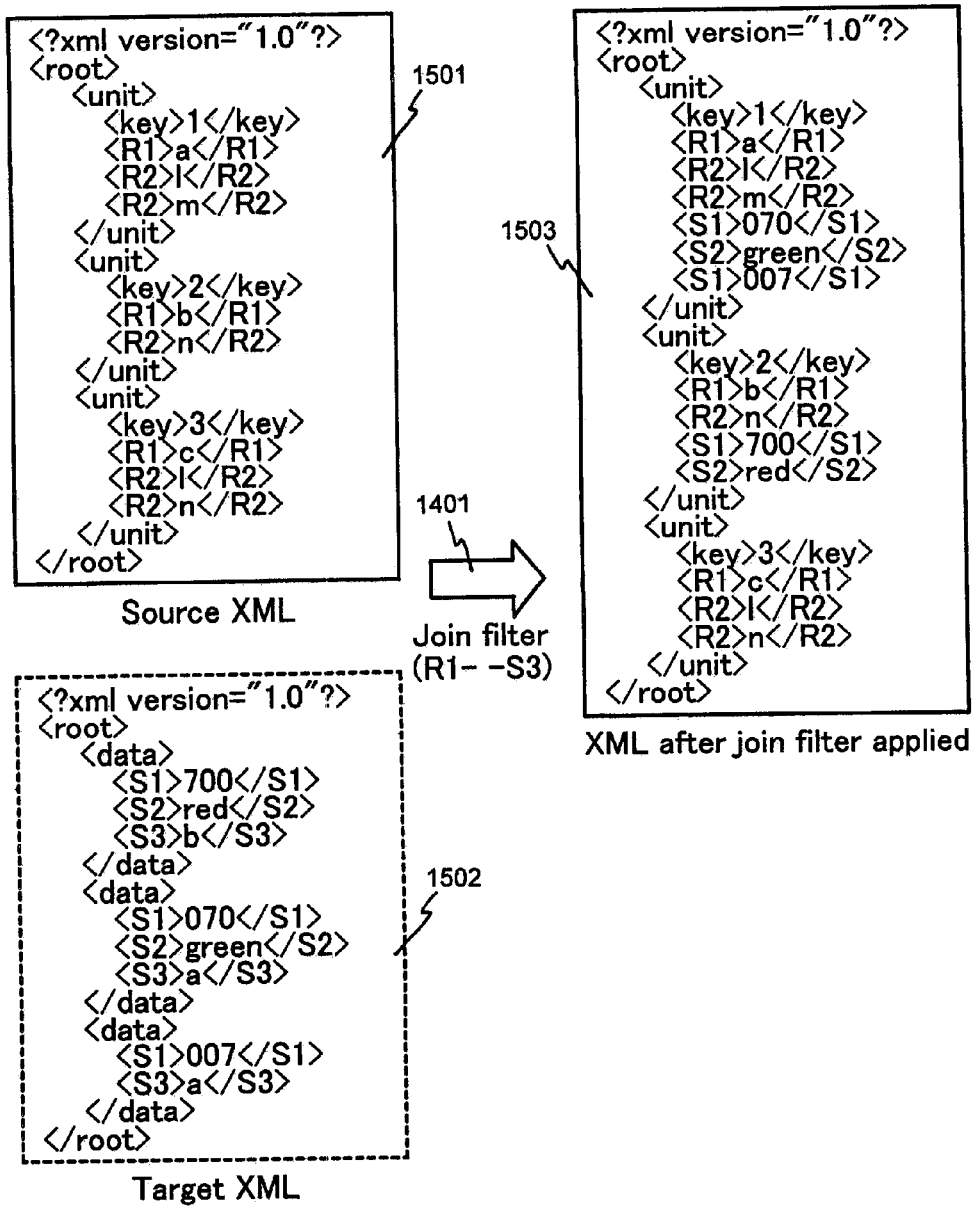
FIG. 15 is a view showing an example of an XML after the application of the Join filter.

FIGS. 14 and 15 are explanatory views for an application example of a Join filter. The Join filter is a filter for joining a designated element to an element existing in the other XML file. In the event of creating the Join filter, a source element, a target XML file and a target element are designated by mouse and the like, and the Join filter is activated. By this operation, an element in a brother relationship with the target element, that is, an element having the same parent element is newly created as a brother element of the source. In this case, on the XML file, data included in the source element and data included in the target element are collated, and elements having equivalent data are joined. FIG. 14 shows a creation example of the Join filter for joining the element R1 of the source hierarchical unit tree shown in FIG. 4 and an element S3 of the target hierarchical unit tree generated from the other XML file. By the application of this Join filter, elements S1 and S2 as brother elements of the element S3 are added to the source hierarchical unit tree as shown in a lower part of FIG. 14. In the case of this example, an XML after the application of the Join filter becomes as shown in FIG. 15 corresponding to the change of the hierarchical unit tree and the data of the elements R1 and S3.

Here, description will be made for conversion of the XML data by the filter path used for the transformation of the hierarchical unit tree. As shown in FIG. 1, the filter path is the one in which a plurality of filters are sequentially arrayed. Moreover, with regard to the entire filters, prepared are the one for transforming the hierarchical unit tree and the one for transforming the XML data. Specifically, the filter path created for transforming the hierarchical unit tree becomes the filter path for transforming the XML data by replacing the filters constituting the filter path to the ones for the XML data. Here, in order to execute the above operation, a condition is set as below. Specifically, the hierarchical unit tree generated from the XML data 109 transformed from the XML data 104 by the lower filter path 115 for the XML data must be equal to the hierarchical unit tree 108 transformed from the hierarchical unit tree 105 by the upper filter path 115 for the hierarchical unit tree having the same filter constitution as the lower filter path 115.

Hereinbelow, description will be made for an example of problem solution using subsets of clinical data. Object data has results of fungi inspections for MIC and results of catheter treatments. First, with regard to the fungi inspections for MIC, though, in general, no trouble particularly occurs in processing such small data aggregates as they are, since care must be taken for handling the data aggregates when other results of fungi inspections mixedly exist, processing for collecting the data aggregates into one is carried out. Moreover, with regard to the catheter treatments, attributes having the same meaning are split into "Catheter 1", "Catheter 2" and "Catheter 3" for the convenience of data input, and these attributes are desired to be collected into one catheter. Specifically, grouping is carried out with regard to the fungi inspections for MIC, and name changing is carried out with regard to the catheter treatments.

An example to which the Rename filter (name changing) and the Group filter (grouping) are applied will be described with reference to FIGS. 16 to 18. The Rename filter is a filter for collecting attributes into one when the element names are changed and attributes having the same name consequently exist including a route seen from the document entity. The Group filter is a filter for moving an object element to a child of one new element.

Figure 5:
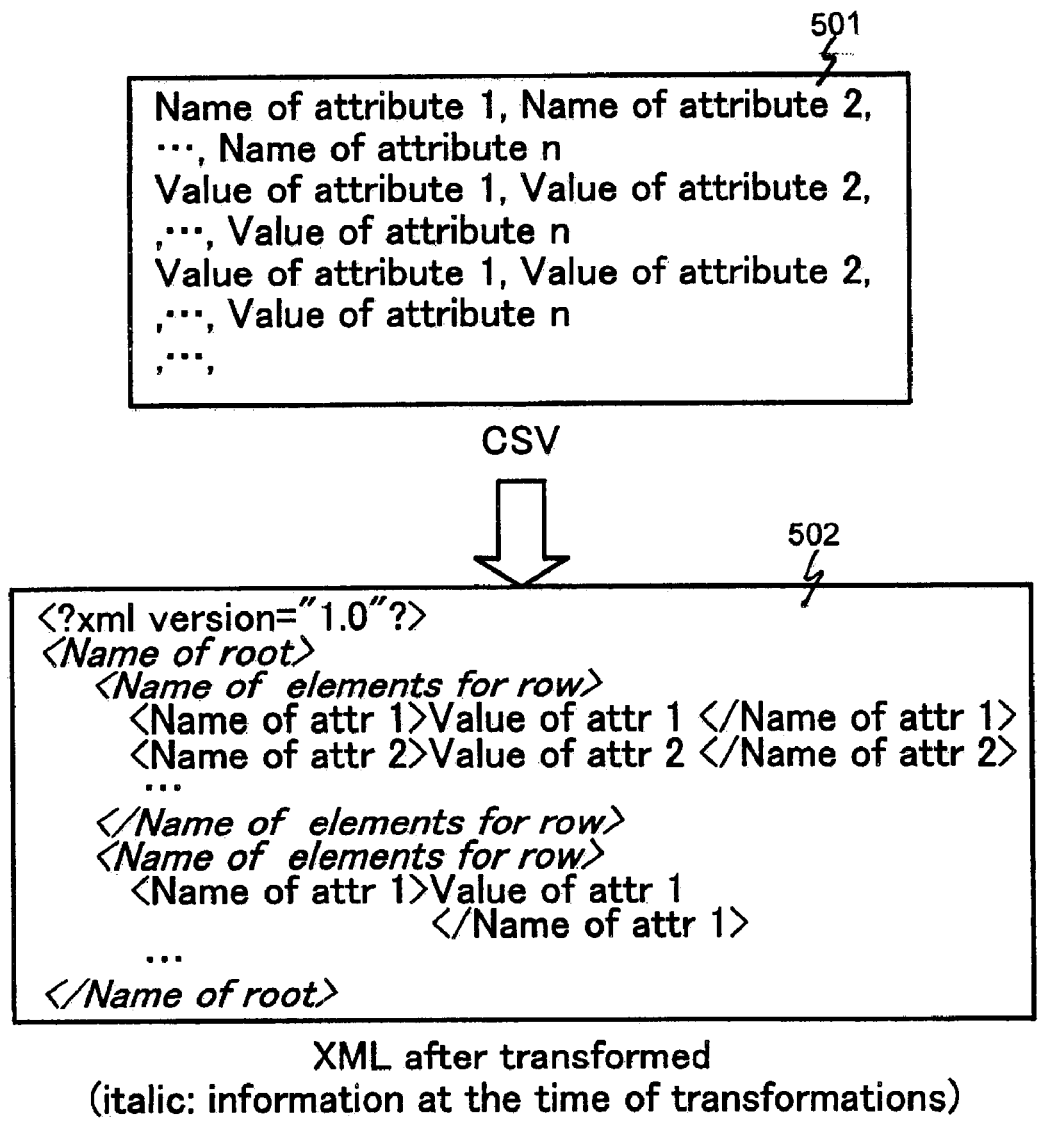
FIG. 5 is a view showing conversion from an XML to a CSV.
Figure 16:
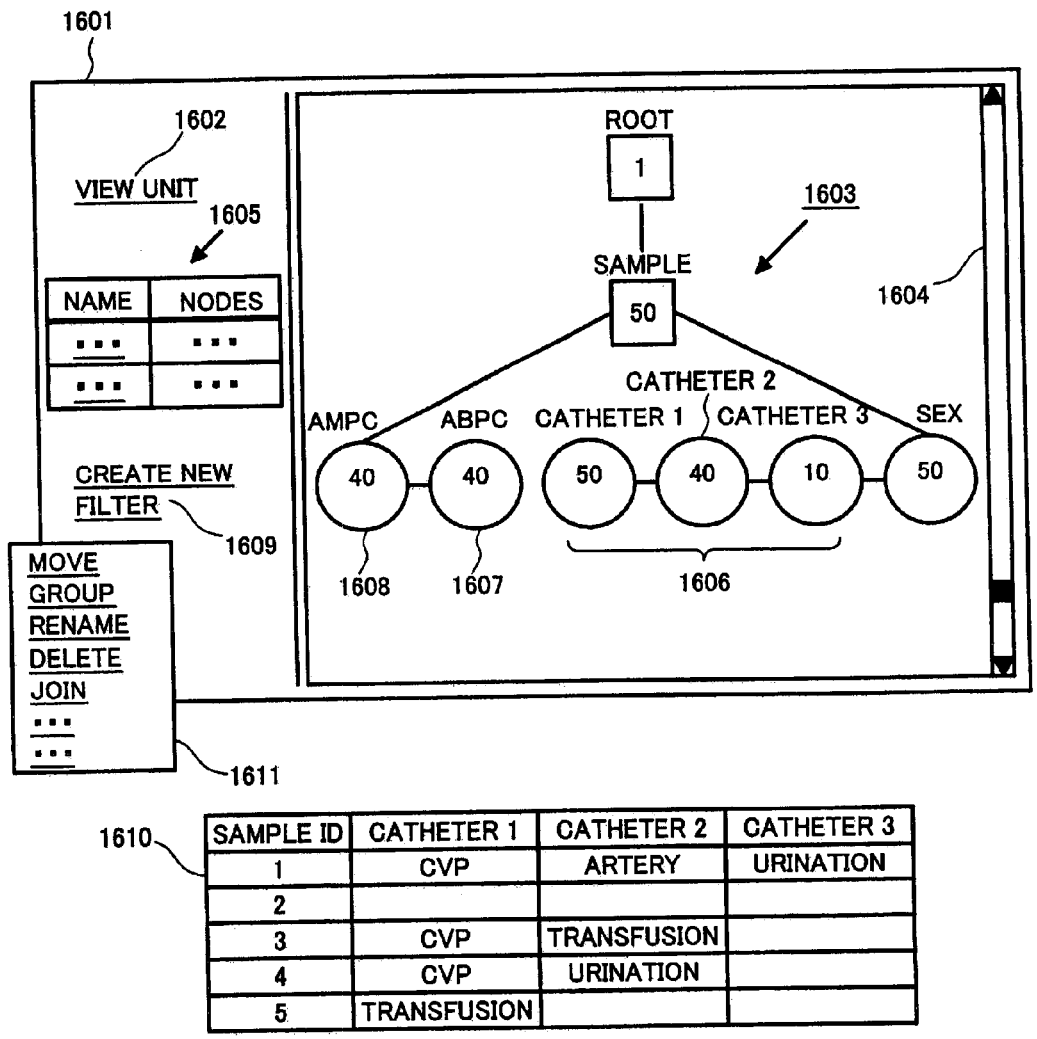
FIG. 16 is a view showing a screen example in an initial state of a system according to the present invention.

FIG. 16 is a view showing an example of an initial state of the hierarchical unit tree. A hyperlink 1602 from an operation frame 1601 to a view is clicked, whereby a view 1603 of the hierarchical unit tree displaying a state of the unit in a tree structure is displayed on the right side of the screen. The view 1603 can be adjusted so as to be easily seen by a scroll bar 1604 or by a zooming operation with a mouse. Moreover, the filter applied to each element can be grasped by a filter path 1605. In the initial state, a hierarchical structure is not adopted in many cases as on the view 1603. For example, in this initial state, the attributes representing the same catheter 1606 are described parallel in different names of "Catheter 1", "Catheter 2" and "Catheter 3". A table 1610 is for notating source data on CSV, and when output to the analysis algorithm regarding sample ID rows and catheter columns is created in the above state, since no filter is applied thereto, the table 1610 is obtained. In order to create the output to the analysis algorithm, first, the filter path is applied to the XML as the source data inside the system, and further, a conversion program from the XML to the CSV, which performs conversion reverse to the conversion shown in FIG. 5, is applied thereto. In this case, in the catheter 1606, when the three names of "Catheter 1", "Catheter 2" and "Catheter 3" are in different columns, these three are not regarded to be in the same attribute depending on the analysis algorithm, which is inappropriate. Moreover, though not being outputted to the table 1610, abpc 1607 and ampc 1608 as items of the fungi inspection for MIC are desired to be handled as one group. It is assumed that the user grasps all the above.

In this state, a filter for performing the preprocessing for the data has not been prepared yet. Accordingly, in order to create a new filter, the hyperlink 1609 for creating a filter in FIG. 16 is clicked. Then, a subwindow 1611 for filter selection opens, and candidates for the filter are displayed on the screen. The Rename filter is selected therefrom.

Figure 17:
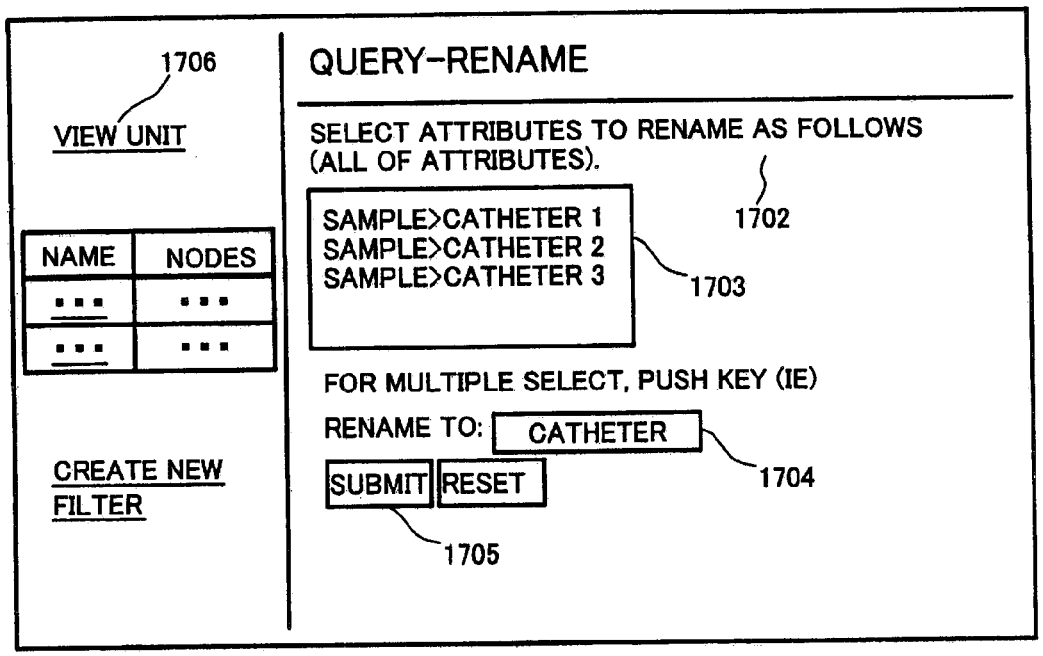
FIG. 17 is a view showing an example of a creation screen of a query.
Figure 18:
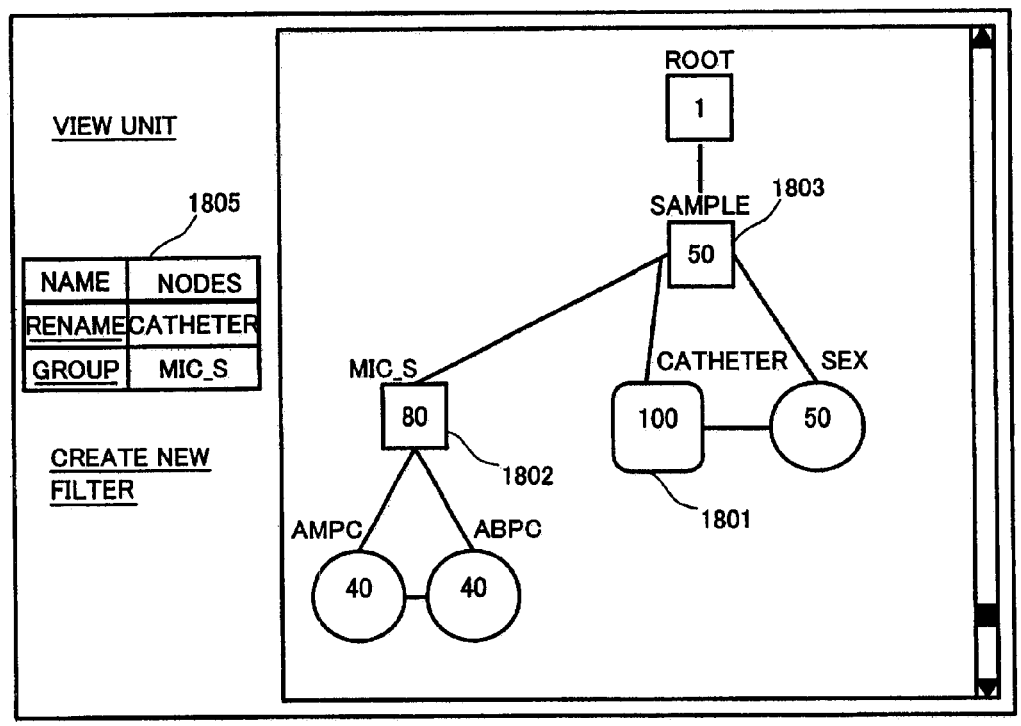
FIG. 18 is a view showing an example of a display of a preprocessing result.

When the Rename filter is selected, a screen as shown in FIG. 17 is displayed. FIG. 17 is a screen for collecting information required for creating the Rename filter. On the right side of the screen, a question sentence 1702 and an answer box 1703, which are required for applying the Rename filter, are displayed. A plurality of attributes for which the name changing is desired to be performed are selected from the answer box 1703, and the name already changed is inputted to a text box 1704, then an input transmitting button 1705 is pressed. Accordingly, the name is posted to the system. In the case where the Catheter 1, the Catheter 2 and the Catheter 3 are selected by mouse on the view 1603 of FIG. 16, and thereafter, the Rename filter is selected on the subwindow 1611 displayed by clicking the hyperlink 1609 for filter creation, then the Catheter 1, the Catheter 2 and the Catheter 3 are selected in the answer box 1703 on the screen of FIG. 17.

The operation similar to the above is carried out also for the element abpc 1607 and the element ampc 1608 with regard to the Group filter, "MIC" is inputted as a group name of the element abpc 1607 and the element ampc 1608, and the hyperlink 1706 to the view is clicked. Then, a view as shown in FIG. 18, which reflects the Rename filter and the Group filter, can be obtained. A filter path 1805 shows the filters already applied. A catheter 1801 is recognized as an attribute having a one-to-multi relationship to one parent attribute. As a result of applying the Group filter to MIC 1802, the MIC 1802 adopts a hierarchical structure. When output from this view with regard to the sample ID rows and the catheter rows is carried out, a table 1804 is obtained, where the one-to-multi relationship between a sample 1803 and the catheter 1801 is correctly expressed.

Figure 19:
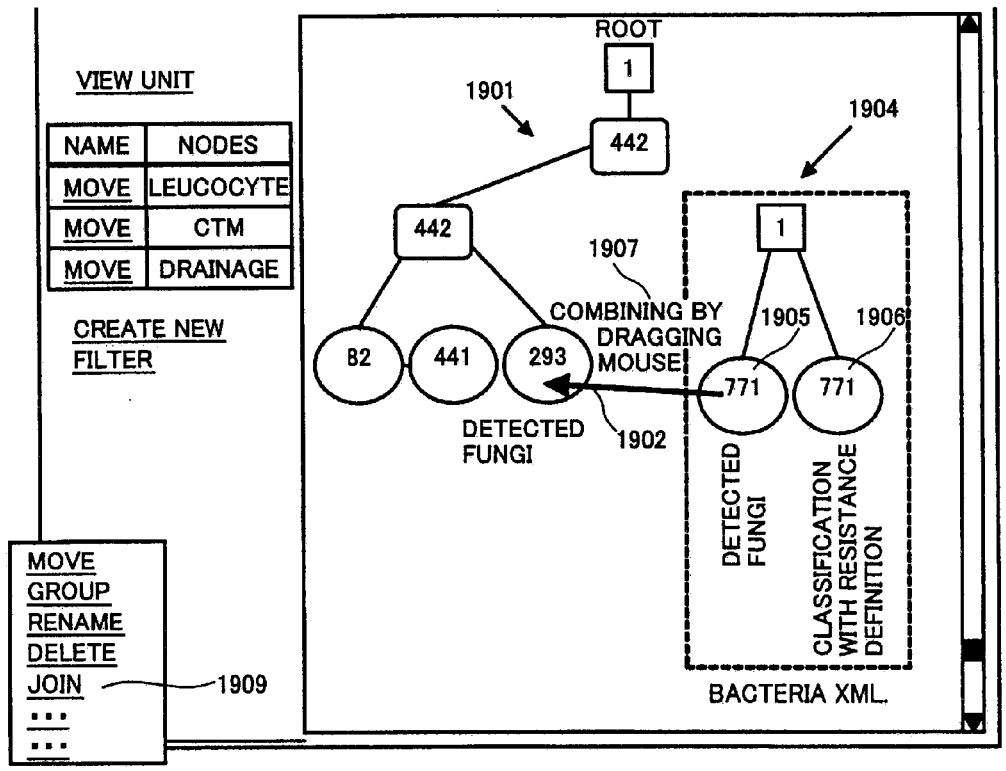
FIG. 19 is a view showing an example of the Join filter.
Figure 19:
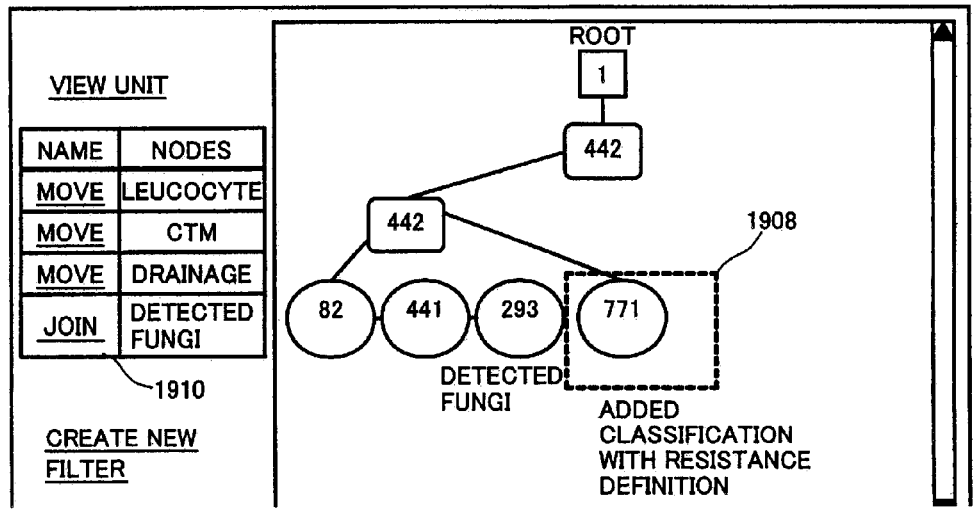

An example of applying the Join filter will be described with reference to FIG. 19. Here, consideration is made for classifying attributes of elements 1902 with resistance-definition-classification attributes 1906 referred to as bacteria.xml in the other XML file, the elements 1902 having an attribute name of "detected fungi" in a hierarchical unit tree 1901. Here, the Join filter has already been defined, and elements 1906 having an attribute name of resistance-definition classification in bacteria.xml and elements 1905 having an attribute name of detected fungi in bacteria.xml have already been joined to each other. For the joining, mouse dragging is used. The joining is established by dragging the elements 1905 of the detected fungi attribute in a hierarchical unit tree 1904 representing bacteria.xml to the elements 1902 of the detected fungi attribute in the hierarchical unit tree 1901. If this dragging is carried out when not the Join filter but the Move filter is selected, it means that the elements 1905 of the detected fungi attribute is moved to a child of the resistance-definition-classification attributes 1906. By this joining, the resistance-definition-classification attributes 1906 located in the same hierarchy as the elements 1905 of the detected fungi attribute in bacteria.xml are created in the same hierarchy as the elements 1902 of the detected fungi attribute. In the actual XML data, elements having the same data in the elements 1902 of the detected fungi attribute and the elements 1905 of the detected fungi attribute are joined to each other. The Join filter is applied by clicking a filter name portion 1909 thereof. It is understood that resistance-definition-classification attributes 1908 are added to the hierarchical unit tree to which the Join filter has already been applied, and that the Join filter 1910 is added to the filter path.

Figure 20:
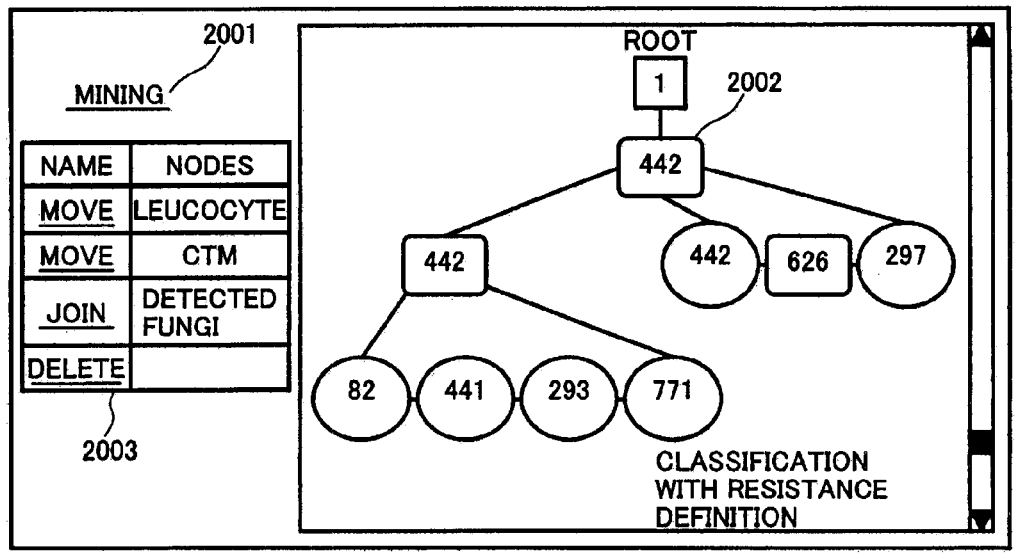
FIG. 20 is a view showing an example where correlation between self-evident attributes was discovered in an attribute selection algorithm.
Figure 20:
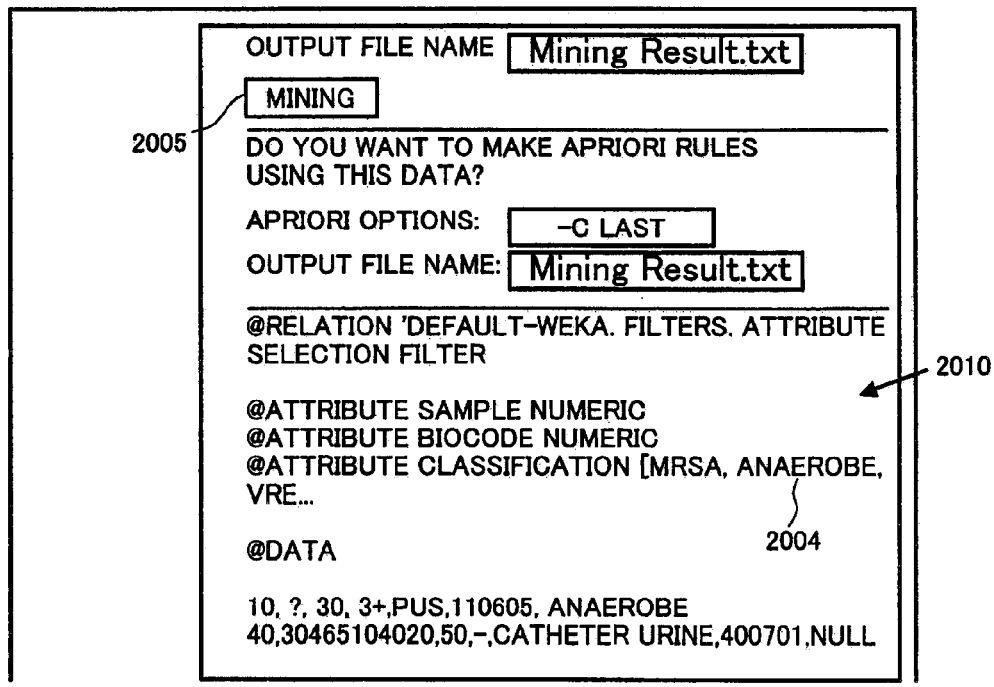

An example of feedback from a mining algorithm will be described with reference to FIGS. 20 and 21. First, the preprocessing has already been performed to some extent in FIG. 20, where the input file to be inputted to the mining engine, which is a program for generating a decision tree of the mining engine, is created in order to obtain a decision tree with regard to the resistance definition classification. In the mining engine, attribute selection can be carried out by use of a built-in algorithm such as a highest priority selection method. Here, it is understood that an attribute 2004 in which correlation with the resistance definition classification is self-evidently high before making the decision tree is extracted as an attribute having high correlation therewith actually. When such an attribute is included, the decision tree is statistically dominated thereby, and only a self-evident decision tree can be obtained. Therefore, such an attribute must be removed.

Figure 21:
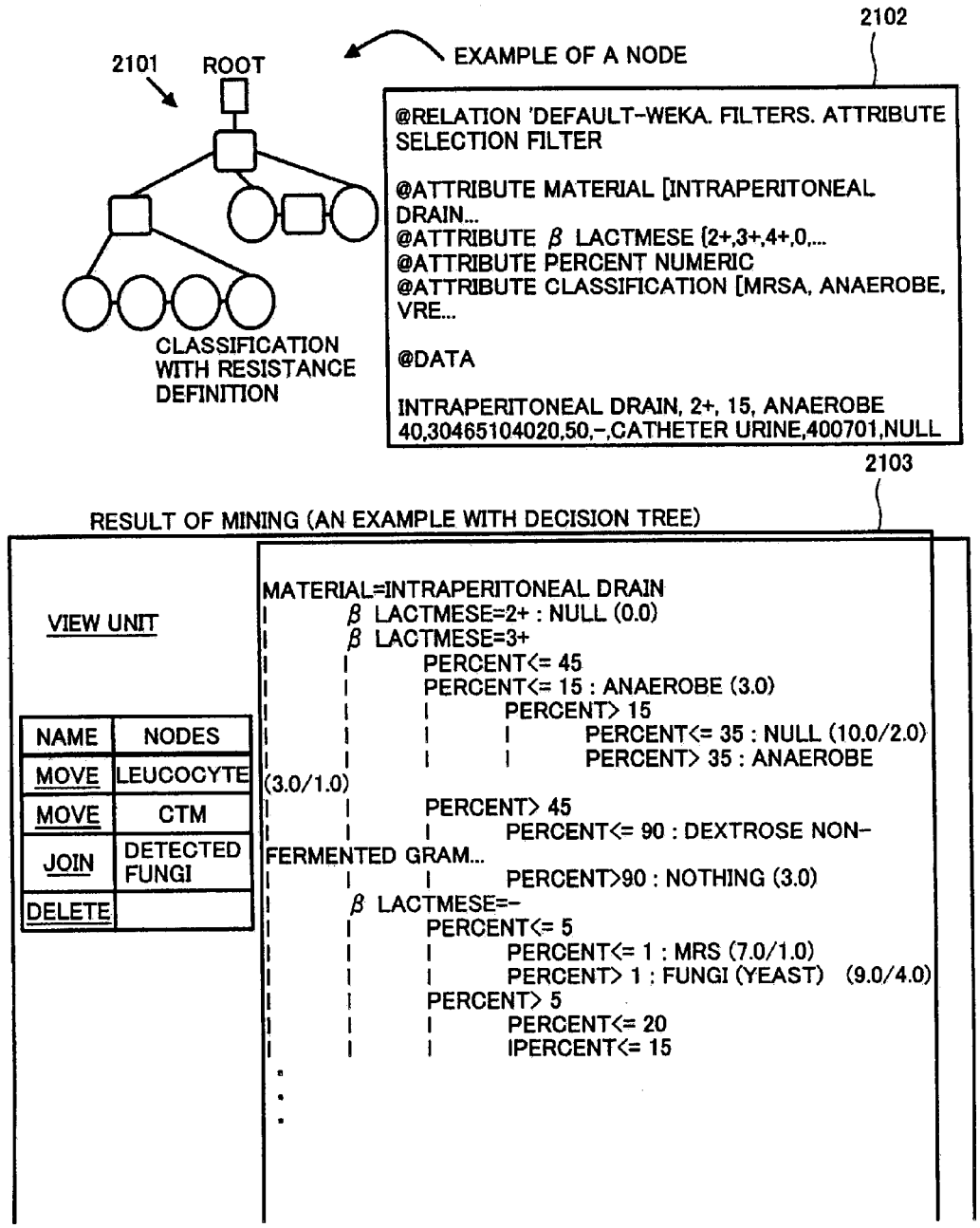
FIG. 21 is a view showing an example where a decision tree was obtained by removing the correlation between the self-evident attributes in the attribute selection algorithm.

A reference numeral 2102 in FIG. 21 denotes a mining result, which is obtained by performing the feedback in the above-described manner and is constituted of the attribute in which the correlation with the resistance definition classification is not self-evidently high but actually high. A hierarchical unit tree 2101 in this case has the same structure as a hierarchical unit tree 2002 in FIG. 20. However, a different mining algorithm is applied thereto, and thus a different result is obtained. It can be expected that an interesting decision tree is obtained from such a mining result, and the decision tree actually obtained is the one as denoted by a reference numeral 2103.

Figure 22:
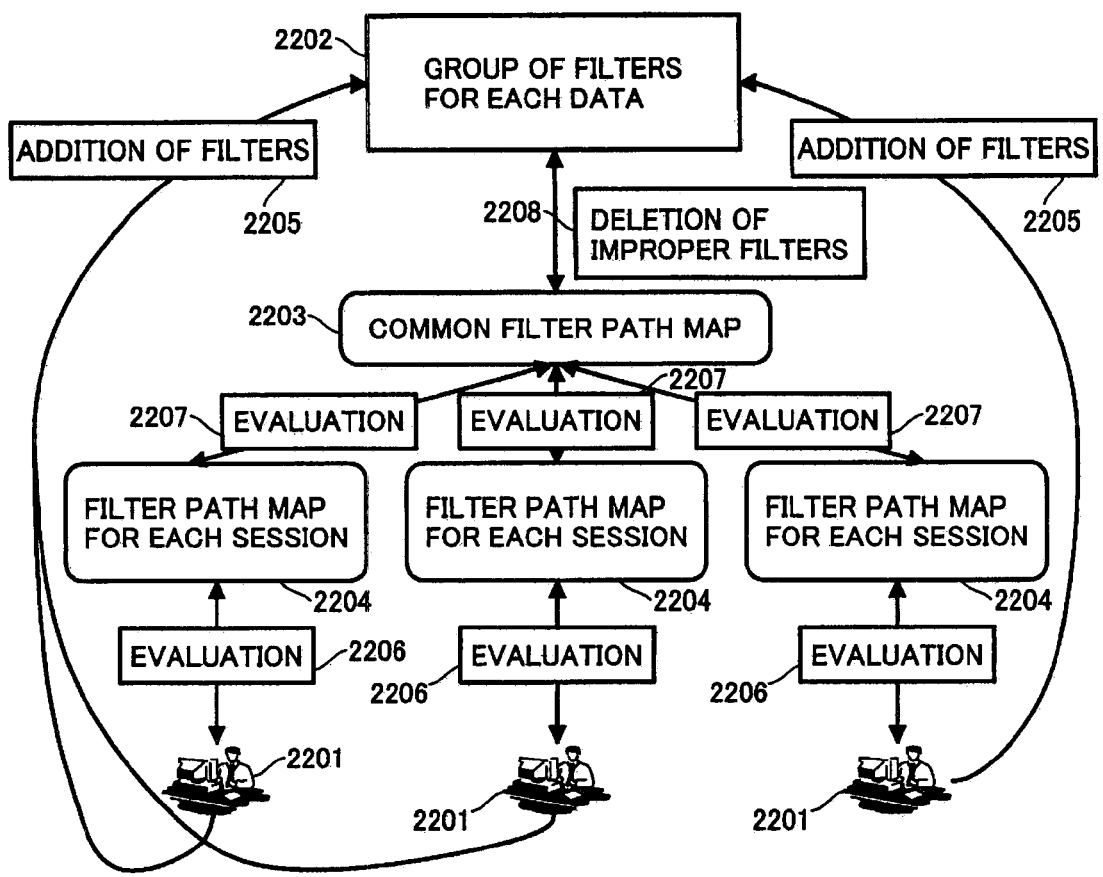
FIG. 22 is a view schematically showing a flow of weight sequencing.

All the above is a part where the process of the preprocessing is unitarily carried out. FIG. 22 is a view schematically showing sequencing for use in the case where the system creates a large number of application columns of filters by reusing the filters created once. This drawing shows a flow of classical weighting. Each of users 2201 creates a filter that does not exist in a filter group 2202 and makes an addition 2205 thereof to the filter group 2202. The filters of the addition 2205 thereto are commonly shared by a plurality of the users 2201 and weighted for each of the users. While the weighting of the filters is varied depending also on a state of the unit, the filters are held by a common filter path map 2203. Evaluation for the common sharing is varied depending on evaluations 2206 from the users 2201. Such evaluation reacts promptly to the evaluations 2206 to filter path maps 2204 for each session, but does not react so promptly to evaluations 2207 to the common filter path map 2203. Deletion 2208 from the filter group 2202 is performed by the common filter path map 2203 for filters having weight lower than a certain threshold value. By use of the filters weighted as described above, selection of the filter paths is automatically carried out based on the resemblance of the hierarchical unit trees.

Figure 23:
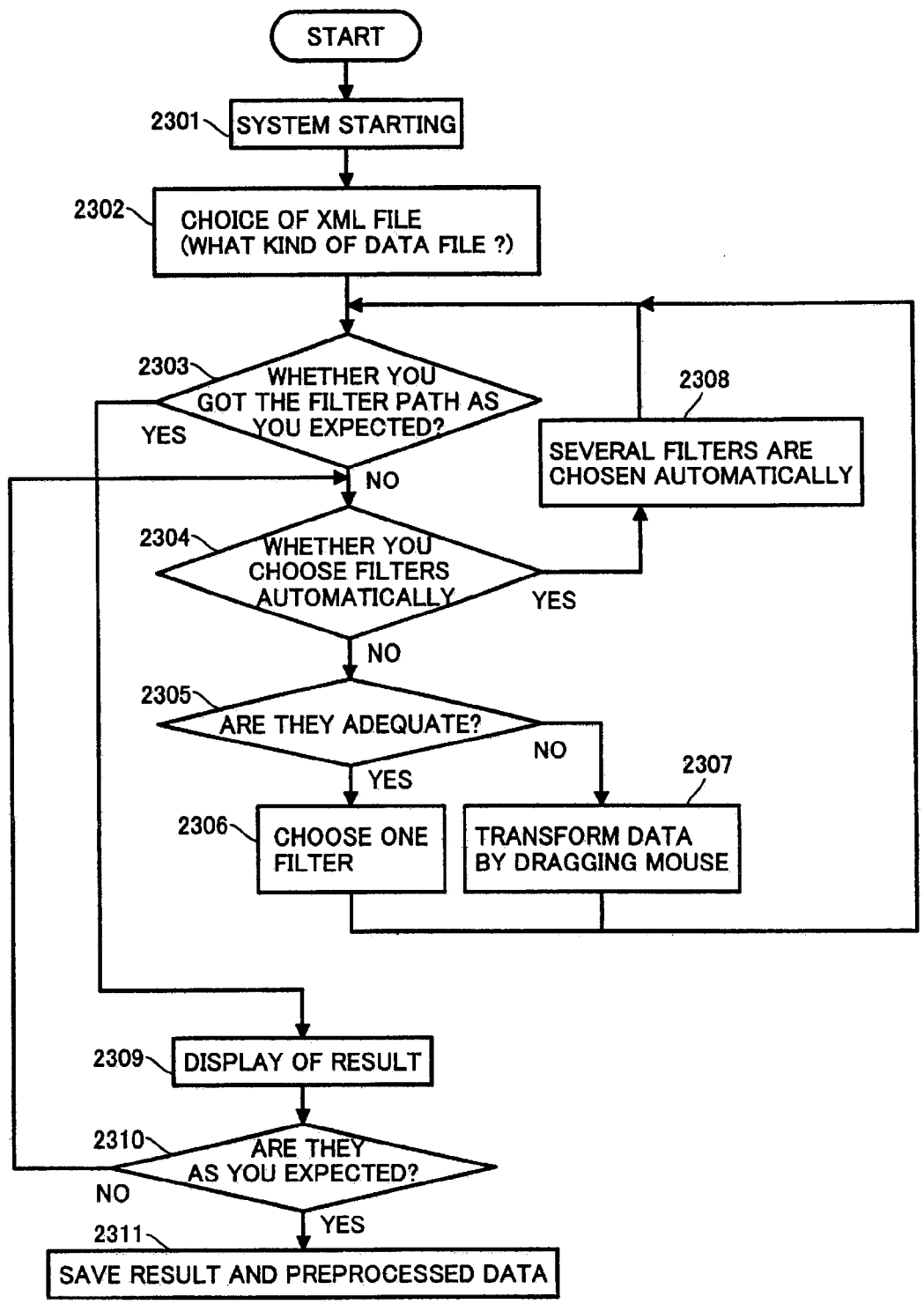
FIG. 23 is a flowchart showing a processing procedure of the system of the present invention.

FIG. 23 is a flowchart of the system created in the present invention. After activating the system (step 2301), the user selects an XML file (step 2302). Since the filter path is initially null, a filter is selected. In the case where the filter is automatically selected, the process proceeds from step 2304 to step 2308, where a plurality of filters are automatically selected. With regard to the case of selection by the user himself/herself, when a desired filter is judged to be already created in step 2305, the filter is selected from the already created filter group (step 2306); otherwise, a filter is newly created on the Web browser (step 2307) and added to the filter path. Selection is performed in such a manner, and if a filter path as desired is judged to be finally obtained in step 2303, the filter path is applied to the XML file, and an analysis result is displayed (step 2309). If the analysis result is not a desired one, the process returns to the selection of the filter. If the analysis result is judged to be a desired one in step 2310, the analysis result and the data already subjected to the preprocessing are stored (step 2311), then the process is terminated.

Heretofore, various types of data such as expression and clinical data have been individually processed manually by experts, and thus noise removing therefrom, input thereof to the mining and the like have been carried out. In the present invention, the data conversion and input can be dynamically carried out by changing the node conditions of the hierarchical unit tree, thus making it possible to perform the mining efficiently with high precision.

What is claimed is:

1. A method of preprocessing for data mining, comprising the steps of:

creating, from XML data, a hierarchical unit tree as a tree structure in which attributes of the XML data are set as a leaf node and a non-leaf node, a relationship between the attributes without including an attribute value is expressed, and a redundant parent-child relationship between the nodes is optimized by merging;

adding a change to the hierarchical unit tree; and converting the XML data so as to reflect the change added to the hierarchical unit tree.

2. A method of preprocessing for data mining, comprising the steps of:

displaying, on a screen, a hierarchical unit tree as a tree structure in which a leaf node and a non-leaf node, and a branch expressing a parent-child relationship between the nodes are included, both of the nodes corresponding to attributes of XML data, and a redundant parent-child relationship between the nodes is optimized by merging, the hierarchical unit tree being created from the XML data;

adding a change to the hierarchical unit tree; and converting the XML data so as to reflect the change added to the hierarchical unit tree.

3. The method of preprocessing for data mining according to claim 2, wherein an operation for adding a change to the hierarchical unit tree includes an operation for setting a plurality of nodes as child nodes of a node newly created on the same hierarchy as the plurality of nodes having the same non-leaf node as a parent.

4. The method of preprocessing for data mining according to claim 2, wherein an operation for adding a change to the hierarchical unit tree includes an operation for moving a designated node to a position of a child of the other node than a current parent of the designated node.

5. The method of preprocessing for data mining according to claim 4, wherein the operation for moving a designated node to a position of a child of the other node than a current parent of the designated node is an operation for dragging the designated node by mouse and dropping the designated node on a node newly to be a parent.

6. The method of preprocessing for data mining according to claim 2, wherein the operation for adding a change to the hierarchical unit tree includes an operation for changing attribute names of a plurality of nodes to the same attribute name, the plurality of nodes having the same non-leaf node as a parent, and merging the plurality of nodes.

7. The method of preprocessing for data mining according to claim 2, wherein an operation history for hierarchical unit trees is displayed, the hierarchical unit trees changed by operations are recorded respectively, and when a specified operation step of the operation history displayed is designated, a hierarchical unit tree corresponding to the operation step is displayed.

8. A preprocessing system for data mining, comprising:

a display unit for displaying a hierarchical unit tree as a tree structure in which a leaf node and a non-leaf node, and a branch expressing a parent-child relationship between the nodes are included, both of the nodes corresponding to attributes of XML data, and a redundant parent-child relationship between the nodes is optimized by merging, the hierarchical unit tree being created from the XML data; and a filter selection unit for selecting a filter for adding a change to the hierarchical unit tree.

9. The preprocessing system for data mining according to claim 8, further comprising: a history display unit for displaying a history of filters applied to the hierarchical unit tree.

* * * * *